Dec. 25, 1956  R. L. SINK  2,775,755
ANGULAR POSITION TRANSDUCER
Filed July 13, 1953
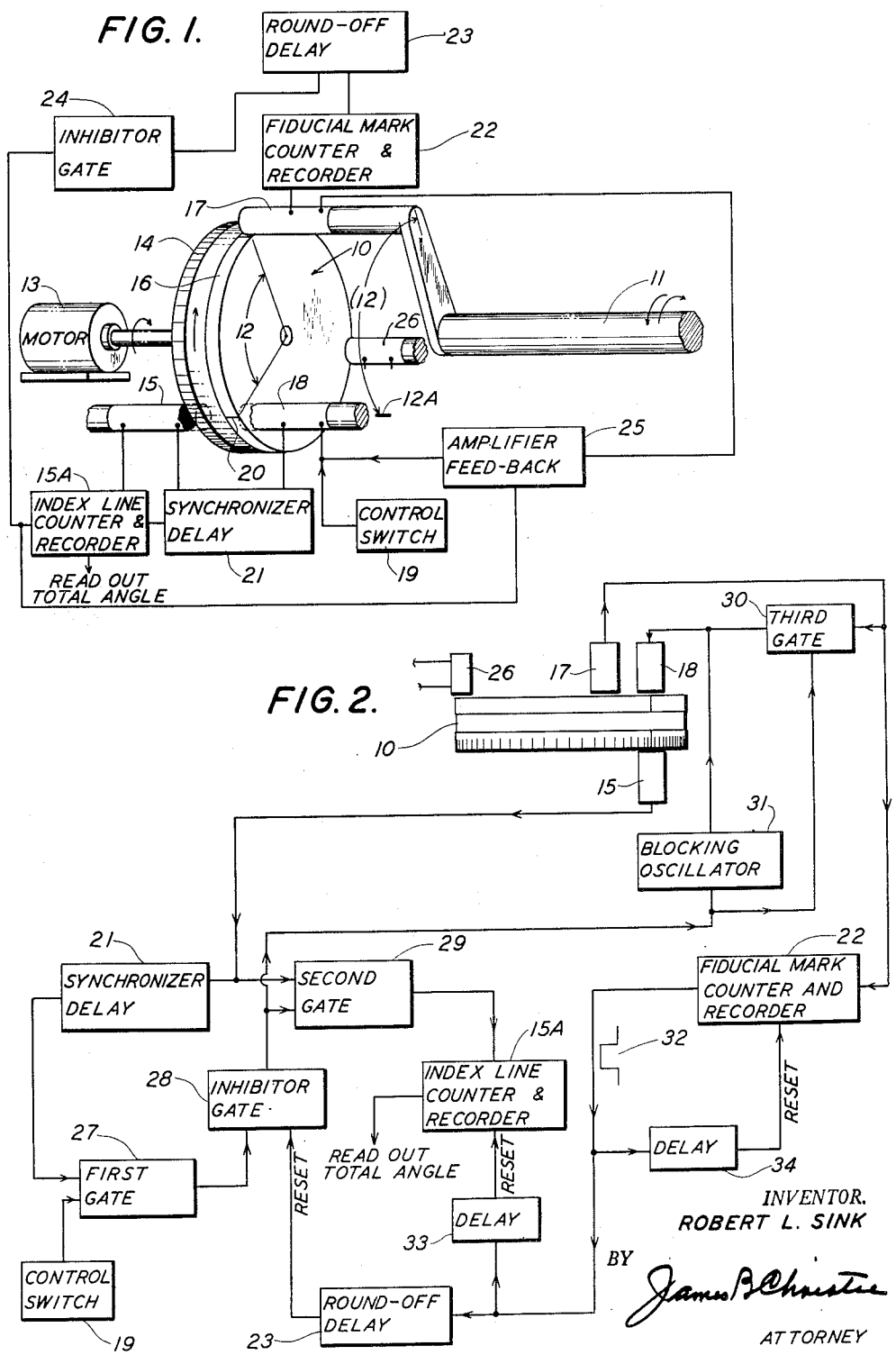
INVENTOR.
ROBERT L. SINK
BY
*James B. Christie*
ATTORNEY United States Patent Office 2,775,755
Patented Dec. 25, 1956

2,775,755

ANGULAR POSITION TRANSDUCER

Robert L. Sink, Altadena, Calif., assignor, by mesne assignments, to Consolidated Electrodynamics Corporation, Pasadena, Calif., a corporation of California Application July 13, 1953, Serial No. 367,711

7 Claims. (Cl. 340—359)

This invention relates to apparatus for measuring the position of a shaft or rotatable member with respect to an angular reference position. More specifically, this invention provides angular position transducers of improved accuracy as compared with presently available shaft monitoring systems.

In recent years it has become increasingly important to be able to measure accurately the degree of rotation of a shaft or other rotatable member from a reference position. For example, this type of measurement is important in evaluating antiaircraft fire control systems. In the development of adequate antiaircraft defenses, it is necessary that range finding and gun pointing systems be evaluated as the work proceeds. A crude method for evaluating a fire control system would be to project a target into the air and see if the antiaircraft system could hit it. However, this method has considerable disadvantage in that the targets which must be used are often very expensive. Therefore it is desirable to be able to determine if the antiaircraft gun is properly tracking the target without having to destroy the target. It is also desirable to have continuous information from the gun to indicate the degree of error which may be present in tracking the target.

To achieve these two desirable effects, the following system is now used: A target is projected into the air and its position is determined very accurately by the use of theodolites. At the same time the theodolites are accurately tracking the position of the target, the fire control system being tested is also tracking the target. Angular position transducers, i. e. shaft monitors, are attached to the rotatable members of the gun so that the elevation and azimuth of the gun barrel can be calculated as required to compare the tracking of the target by the gun with the known position of the target as determined by the theodolites. As aircraft are developed which fly at ever increasing altitudes and speeds, shaft monitors with higher accuracy are required. My invention provides this additional required accuracy.

One type of shaft monitor to which my invention is applicable consists of two major components. The first component is an electro-mechanical locator which physically measures the position of the shaft as it rotates slowly or perhaps only intermittently. The second component is an electronic converter which converts the physical data of the locator into electrical form to facilitate data storage and processing. The locator incorporates a drum rotatable about the same axis of rotation as the shaft but independently thereof. Means are provided for continuously rotating the drum at substantially a constant and high speed. A permanent index track containing equally spaced magnetic index marks is affixed around the drum and rotates with it. A magnetic index reading head is mounted adjacent to the index track so that the index marks can be measured as required. A magnetizable track is also affixed around the drum and rotates with it. A rigidly mounted magnetic head is fixed adjacent the periphery of the magnetizable track at a reference position. A second magnetic head is attached to the shaft and rotates therewith about the periphery of the magnetizable track. Thus, the distance around the periphery of the magnetizable track (and rotating drum) from one magnetic head to the other depends upon how far the shaft is rotated from the reference position. In operation the degree of rotation of the shaft from the reference position is determined by causing one of the magnetic heads to make a fiducial mark on the rotating magnetizable track. When the mark is made the index reading head is energized and begins detecting the index marks as they pass the index reading head. The marks are counted and the information is recorded. The counting of index lines continues until the fiducial mark is rotated past the other magnetic head, which then inactivates the index reading head. Thus, the index line counter determines the number of index marks passing it between the making of the magnetic mark by a first magnetic head and the reading of the magnetic mark by a second magnetic head. This information readily gives the angular rotation of the shaft from the reference position, since the distance between the index marks and the diameter of the drum are known. A magnetic erasing head located adjacent the magnetizable track is energized for one complete revolution of the magnetizable track after a measurement has been made to prepare the track for the next reading. Thus, with a device of this type approximately two revolutions of the drum are required for each measurement of shaft position. In addition, the accuracy with which shaft position can be measured with this device depends critically on the accuracy with which the index marks are located on the index track. At the present state of the art, economic considerations impose an upper limit on the accuracy obtainable with this device of about plus or minus 0.1°.

My invention contemplates an inexpensive improvement which enables the preceding device to measure shaft position with a much higher degree of accuracy than is now possible. Basically, my invention involves the provision of means for rapid multiple measurement of the same angle in such manner as to cancel errors of a strictly random nature so that such errors, which are inherent in the previous method, are greatly reduced. The greatest source of such random errors is the upper limit of the accuracy with which the indexing marks can be placed on the indexing track. If the error is such that the average absolute error is the equivalent of plus or minus 0.1°, then that limits the accuracy to which a measurement can be made with the prior shaft monitors. As will be seen, my improvement permits measurement of angles with much greater accuracy, even though the same type of index track is used. Broadly, my invention contemplates a device for measuring angular rotation of a shaft with respect to a reference position which incorporates a drum capable of rotation about the same axis as the rotatable member but independently thereof, indexing means on this drum so that its angular rotation for any desired period of time can be detected and recorded, a ring of recording material around the drum, recording mechanism disposed adjacent the ring of recording material, a pick-up mechanism mounted to the shaft and rotatable therewith about the periphery of the recording ring, automatic feed-back means from the pick-up device to the recording device, and means for counting the number of recorded signals detected by the pick-up device.

With my device the angle to be measured is continuously recreated on the recording track for as many times as may be desirable or required to obtain the degree of accuracy needed for any particular application. The number of times that the angle is recreated on the recording track is recorded. While the angle to be measured is continuously recreated on the recording track, the pick-up head associated with the index track records the total angle of revolution through which the drum is rotated during the measurement. The true value of the angle being measured is then obtained by simply dividing the total angle of rotation of the drum by the number of times that the angle is recreated on the recording track. Thus, with my device a plurality of measurements, say a hundred, can be made continuously to eliminate random error and thus greatly increase the absolute accuracy of the angle measurement.

These and other aspects of my invention will be understood more thoroughly in the light of the following detailed description, taken in conjunction with the accompanying drawings in which:

Fig. 1 is a perspective view of my device for measuring the angular rotation of a shaft from a reference position.

Fig. 2 illustrates in block diagram form a type of electrical circuit which may be used to put my invention into practice.

Referring to Fig. 1, a drum 10 rotatable about the same axis of rotation as a shaft 11, but independently thereof, is positioned near the end of the shaft whose angle 12 of rotation from a fixed reference position 12A is to be determined. The drum is revolved at a substantially constant and relatively high speed by a motor 13 attached to it. A strip 14 of magnetic index marks encircles the drum and is rotatable therewith. A magnetic index line pick-up head 15 is disposed adjacent the periphery of the drum and near the strip of index lines. The index line pick-up head is attached to an index line counter and recorder 15A. A magnetizable strip 16 encircles another portion of the drum and is rotatable therewith. A magnetic fiducial mark pick-up head 17 is attached to the shaft and rotatable therewith about the periphery of the drum and near the magnetizable strip. A magnetic fiducial mark recording head 18 is disposed adjacent the drum and near the magnetizable strip to establish the fixed reference position. A control switch 19 for enabling the magnetic recording head to record a first magnetic fiducial mark 20 on the magnetizable strip is connected to the recording head. A synchronizer delay 21 is connected between the recording head and the index reading head. A fiducial mark counter and recorder 22 is attached to the magnetic fiducial mark pick-up head to count and record the number of fiducial marks passing the fiducial mark pick-up head. The fiducial mark counter and recorder is connected through a round-off delay 23 to an inhibitor gate 24 of the bi-stable multivibrator type which stops the index line counter after a predetermined number of fiducial marks have been detected by the pick-up head. The magnitude and function of the round-off delay associated with the feed-back means is explained below. An automatic feed-back 25 is connected between the magnetic pick-up head and the magnetic recording head to cause the recording head to make a second fiducial mark when the first fiducial mark is detected by the pick-up head. A magnetic erasing head 26 is disposed adjacent the magnetizable strip at a position so that any point on the magnetizable strip passes the following elements in the order listed: the magnetic recording head, the magnetic pick-up head, and the magnetic erasing head.

In operation the angle of rotation of the shaft is measured as follows: The drum is rotating at a high speed, being driven by the motor. The magnetic fiducial mark recording head is energized by the manually operated control switch to enable the first magnetic fiducial mark to be made on the magnetizable strip. The recording of the fiducial mark on the strip is produced by a signal generated by the next index line passing the magnetic index line pick-up head after the control switch has been closed. However, the signal is delayed by the synchronizer delay so that the first fiducial mark is placed on strip at the exact moment the following index line passes the index line pick-up head. The signal from the synchronizer delay also starts the index line counter recording index marks when the first fiducial mark is recorded on the magnetizable strip. The first fiducial mark is carried by the rotating drum past the magnetic fiducial mark pick-up head attached to the shaft. The pick-up head detects the fiducial mark and the counter attached to the pick-up head records the mark. At this point one measurement of the angle of rotation of the shaft has been made, and it is subject to the same random errors as measurements made with earlier shaft monitors. However, on detecting the first fiducial mark the pick-up head also actuates the automatic feed-back means to cause the magnetic recording head to place a second magnetic fiducial mark on the magnetizable track. The preceding process is repeated so that the second fiducial mark causes a third mark to be imposed on the strip, and etc. The erasing magnetic head removes the fiducial marks after they have been carried past the magnetic pick-up head, thus leaving the magnetizable strip clear for additional marks. The process of automatically detecting magnetic fiducial marks on the strip and causing additional marks to be placed on the strip is continued until a predetermined number, say a hundred, have been detected by the pick-up head. During this period, the number of index lines passing the index line pick-up head are counted and recorded. When the desired total of fiducial marks is reached, the fiducial mark counter generates a stop signal which passes through the round-off delay to the inhibitor. The index line counter and the automatic feed-back means are turned off by the stop signal coming from the inhibitor gate. Thus, a multiple measurement of the shaft angle has been achieved by successively marking off adjacent segments on the magnetizable strip—each segment being equal to the shaft angle.

A more detailed understanding of how the above steps are performed can be had from reference to Fig. 2 which shows a top view of the rotating drum with the various magnetic heads positioned around it. Fig. 2 also shows how these magnetic heads are connected to the various components of a typical electrical circuit which can be used with my invention. The circuit operates as follows: As in the above case, the drum is rotating rapidly. When the shaft angle measurement is to be made, the control switch is closed momentarily. This places a first electronic gate 27 in the "open" position. The first index line (hereafter referred to as the "energizing" index line) to pass the index line pick-up head after the first gate is opened sends a signal to the synchronizer delay. The signal is delayed at this point and then sent through the first gate to energize an inhibitor gate 28 which in turn opens a second gate 29 and a third gate 30. The signal also causes a blocking oscillator 31 to generate a pulse which in turn causes the fiducial mark recording head to record the first fiducial mark on the magnetizable strip. However, due to the delay imposed on the signal by the delay synchronizer, the recording of the first fiducial mark is delayed by an amount of time equal to that required for the index line following the "energizing" index line to reach the index line pick-up head. Thus, the first fiducial mark is placed on the magnetizable strip at the exact moment an index line is passing the index line pick-up head. The opening of the second gate allows the index line counter and recorder to count and record index lines passing the index line pick-up head. The opening of the third gate allows the fiducial mark pick-up head to feed-back automatically a pulse to the fiducial mark recording head. Thus, a fiducial mark passing the pick-up head causes the recording head to record another fiducial mark on the magnetizable strip. The signal created each time a fiducial mark passes the fiducial mark pick-up head is also fed into the fiducial mark counter and recorder. The fiducial mark counter and recorder is pre-set so that after a fixed number, say a hundred, of fiducial marks have been counted and recorded, it will generate a stop pulse 32. In the meantime, the index line pick-up head is generating pulses as index lines pass it. These pulses pass through the second gate and into the index line counter and recorder where the total number may be read out. After the fixed number of fiducial marks have been counted and recorded, the stop pulse is created to stop the counting and recording of the index lines, and to clear the circuit for additional measurements. The stop pulse first passes through the round-off delay where it is delayed for a period of time required to effect a "round-off" of the index line count as explained below. The stop pulse is then fed to the inhibitor which causes it to close the second gate. This prevents any additional signals from the index line pick-up head from reaching the index line counter and recorder. The stop pulse, after proper delay at an index line counter and recorder reset delay, is then fed into the index line counter and recorder to reset it for another shaft angle measurement. The stop pulse is also fed back into the fiducial mark counter and recorder, after proper delay at a fiducial mark counter and recorder reset delay 34, to reset the fiducial mark counter and recorder for another shaft angle measurement. Thus, 100 measurements of shaft angle have been rapidly obtained and the circuit is properly conditioned for another such reading, if desired, by simply closing the control switch again.

The exact number of times that the angle is reproduced on the magnetizable strip is recorded by the fiducial pick-up head and the sum of these angles is recorded by the index pick-up head. Thus, if the angle being measured is 25.00° and it is measured 100 times, then the index counter will show a reading of 2500°. If the absolute accuracy of the angular measuring system without my device had been plus or minus 0.1°, the value of the angle could have been stated with certainty only to be between 24.9° and 24.1°. However, with my arrangement the total reading is 2500° plus or minus 0.1°, and by dividing this figure by 100, the accuracy with which the value of the angle could be stated is between 24.999° and 25.001°. Thus, it is apparent that my device is readily capable of increasing the accuracy of present angular measuring devices by a factor of at least 100.

It is an important feature of my invention that the angle being measured is marked off on adjacent segments of the magnetizable disc. This provides two advantages: (1) It insures a maximum number of measurements in a minimum period of time, i. e. there is no need for inactivating the system for one revolution of the drum to allow the magnetic erasing head to clear the magnetizable disc; and (2) It tends to utilize the entire periphery of the index strip for the determination of the shaft position. This is highly advantageous in reducing random error due to inaccurate placing of the index lines.

Another important feature of my invention is the "round-off" delay time associated with the automatic feedback means. "Round-off" is a common procedure used in data processing which simply involves reducing a given number of significant figures to a smaller number in such a manner that the smaller number represents as closely as possible the original value. To illustrate, if a value is known to be 43.68 (four significant figures) and only three significant figures are required, then the value is "rounded-off" to 43.7. If the value had been 43.64, it would have been "rounded-off" to 43.6. In other words, if the last significant figure which is to be dropped is 5 or larger, the next remaining significant figure is increased by one unit. If the last significant figure is 4 or less, the next remaining significant figure is left unchanged. This is really the equivalent of adding 5 to the last significant figure to see if the next significant figure is increased by one unit. Round-off procedure finds application in my invention where the magnetic index pick-up head is inactivated at the end of a measurement in between two index lines, i. e. between the index line just counted and the next index line which would have been counted had the index pick-up head not been inactivated. Additional accuracy can be obtained if means are provided to indicate which of the two index lines is closer to the index pick-up head at the instant measurement is stopped. Such means are provided in my invention by the round-off delay between the fiducial mark counter and recorder and the inhibitor gate which turns off the index line counter and recorder on receiving the stop pulse from the fiducial mark counter and recorder.

My round-off mechanism may be employed in any device which counts a sequence of events which are occurring at substantially a constant rate, including the angular position transducer described. It comprises the combination of means for converting the occurrence of the events into a sequence of electrical pulses, means for detecting and recording the sequence of electrical pulses, an electrical gating means which can be opened for an arbitrary length of time to pass the sequence of pulses to the detecting and recording means, and automatic round-off means to cause the gate to remain open following the passage of the sequence of pulses for a time interval equal to approximately one-half the time between two pulses.

In the angular position transducer the total delay time required to achieve round-off corresponds to one-half the time between successive index lines. In general there is an inherent time delay between the reading of a fiducial mark and the writing of a new fiducial mark. This time delay is fixed by the circuit constants and accumulates for each time that a new fiducial mark is generated. The round-off delay component in my circuit is such that the accumulative delays required for the regeneration one hundred times of the fiducial mark plus the delay introduced by the round-off delay component equals one-half the time difference between successive index line signals. Thus the index pick-up head is kept energized for one-half of an index space more than actually would be allowed by the time required to count an arbitrary number of fiducial marks. This allows the index pick-up head to "round-off" the last index line by in effect adding "five" to the last significant figure. Thus, if the index pick-up head is closer to the index line just counted than to the next line, the round-off will be to the counted index line. However, if the index pick-up head is closer to the next index line which would be recorded if the system where not inactivated, the delay will cause the round-off to be that next index line.

It should be noted that there is a possiblity that the circuit constants could be such that the total delay introduced by the fiducial mark regenerative process actually exceeds one-half the time between the appearance of successive index line signals. The amount of such delay introduced by a signal can be ascertained by careful calibration of the actual circuit being used. For example, the accumulation of the delay time associated with the regeneration of the fiducial mark one hundred times might equal exactly 9.1 time intervals measured between successive index signals. This value of 9.1 would be a constant of the circuit and would remain unchanged as long as the shaft angle measurement incorporated the regeneration of the fiducial mark one hundred times and as long as the speed of rotation of the drum is kept constant. For this particular example the round-off delay time is adjusted to 0.4 index time units. Thus the total delay, i. e., the inherent cumulative delay plus the round-off delay, is 9.5 index time units. The final accumulation of counts as recorded in the index counter is exactly nine counts in excess of the correct value, with proper round-off provisions. This error accumulated in the count may be corrected either by presetting the index line and recorder to compensate for the error or by subtracting the error from the index line count after the measurement has been made.

I claim:

1. In a device for measuring rotation of a first member with respect to an angular reference position, the combination which comprises a second member rotatable on the same axis as the first member and independently thereof, means for rotating the second member, a ring of recording medium disposed on the second member and rotatable therewith around its axis, an indexing ring having a plurality of spaced index signals disposed on the second member and rotatable therewith around its axis, a recording head disposed at a fixed position adjacent the ring of recording medium for impressing a first signal on the ring of recording medium, a pick-up head disposed adjacent the ring of recording medium and rotatable with the first member, automatic feed-back means for causing the recording head to make a second signal on the ring of recording medium when the first signal rotates past the pick-up head, automatic means for counting and recording the number of signals impressed on the ring of recording medium, erasing means for removing the signals from the ring of recording material after the signals have been rotated past the pick-up head and before the signal positions have rotated back to the recording head, and automatic means for counting the index signals passing a fixed point adjacent the indexing ring beginning when a signal is impressed on the ring of recording medium by the recording head and ending when a later signal is picked up by the pick-up head.

2. In a device for measuring rotation of a first member with respect to an angular reference position, the combination which comprises a second member rotatable on the same axis as the first member and independently thereof, means for rotating the second member, a ring of magnetic recording medium disposed on the second member and rotatable therewith around its axis, an indexing ring having a plurality of spaced index signals disposed on the second member and rotatable therewith around its axis, a magnetic recording head disposed at a fixed position adjacent the ring of magnetic recording medium for impressing a first magnetic signal on the ring of magnetic recording medium, a magnetic pick-up head disposed adjacent the ring of magnetic recording medium and rotatable with the first member, automatic feed-back means for causing the magnetic recording head to make a second magnetic signal on the ring of magnetic recording medium when the first magnetic signal rotates past the magnetic pick-up head, automatic means for counting and recording the number of magnetic signals impressed on the ring of magnetic recording medium, magnetic erasing means for removing the magnetic signals from the ring of magnetic recording material after the magnetic signals have been rotated past the magnetic pick-up head and before the magnetic signal positions have rotated back to the magnetic recording head, and automatic means for counting the index signals passing a fixed point adjacent the indexing ring beginning when a magnetic signal is impressed on the ring of magnetic recording medium by the magnetic recording head and ending when a later magnetic signal is picked up by the magnetic pick-up head.

3. In a device for measuring rotation of a first member with respect to an angular reference position, the combination which comprises a second member rotatable on the same axis as the first member and independently thereof, means for rotating the second member, a ring of magnetic recording medium disposed on the second member and rotatable therewith around its axis, an indexing ring having a plurality of spaced magnetic index signals disposed on the second member and rotatable therewith around its axis, a magnetic recording head disposed at a fixed position adjacent the ring of magnetic recording medium for impressing a first magnetic signal on the ring of magnetic recording medium, a magnetic pick-up head disposed adjacent the ring of magnetic recording medium and rotatable with the first member, automatic feed-back means for causing the magnetic recording head to make a second magnetic signal on the ring of magnetic recording medium when the first magnetic signal rotates past the magnetic pick-up head, automatic means for counting and recording the number of magnetic signals impressed on the ring of magnetic recording medium, magnetic erasing means for removing the magnetic signals from the ring of magnetic recording material after the magnetic signals have been rotated past the magnetic pick-up head and before the signal positions have rotated back to the magnetic recording head, and automatic means for counting the magnetic index signals passing a fixed point adjacent the indexing ring beginning when a magnetic signal is impressed on the ring of magnetic recording head and ending when a later magnetic signal is picked up by the magnetic pick-up head.

4. In a device for measuring rotation of a first member with respect to an angular reference position, the combination which comprises a second member rotatable on the same axis as the first member and independently thereof, means for rotating the second member, a ring of magnetic recording medium disposed on the second member and rotatable therewith around its axis, an indexing ring having a plurality of spaced magnetic index signals disposed on the second member and rotatable therewith around its axis, a magnetic recording head disposed at a fixed position adjacent the ring of magnetic recording medium for impressing a first magnetic signal on the ring of magnetic recording medium, a magnetic pick-up head disposed adjacent the ring of magnetic recording medium and rotatable with the first member, automatic feed-back means for causing the magnetic recording head to make a second magnetic signal on the ring of magnetic recording medium when the first magnetic signal rotates past the magnetic pick-up head, automatic means for counting and recording the number of magnetic signals impressed on the ring of magnetic recording medium, magnetic erasing means for removing the magnetic signals from the ring of magnetic recording material after the magnetic signals have been rotated past the magnetic pick-up head and before the signal positions have rotated back to the magnetic recording head, and automatic means for counting the index signals passing a fixed point adjacent the indexing ring during the time a magentic signal is impressed on the ring of magnetic recording medium by the magnetic recording head and ending when the last of a fixed number of later magnetic signals is picked up by the magnetic pick-up head.

5. In a device for measuring rotation of a first member with respect to an angular reference position, the combination which comprises a second member rotatable on the same axis as the first member and independently thereof, means for rotating the second member, a ring of magnetic recording medium disposed on the second member and rotatable therewith around its axis, an indexing ring having a plurality of spaced magnetic index signals disposed on the second member and rotatable therewith around its axis, a magnetic recording head disposed at a fixed position adjacent the ring of magnetic recording medium for impressing a first magnetic signal on the ring of magnetic recording medium, a magnetic pick-up head disposed adjacent the ring of magnetic recording medium and rotatable with the first member, automatic feed-back means for causing the magnetic recording head to make a second magnetic signal on the ring of magnetic recording medium when the first magnetic signal rotates past the magnetic pick-up head, automatic means for counting and recording the number of magnetic signals impressed on the ring of magnetic recording medium, magnetic erasing means for removing the magnetic signals from the ring of magnetic recording material after the magnetic signals have been rotated past the magnetic pick-up head and before the signal positions have rotated back to the magnetic recording head, automatic means for counting the magnetic index signals passing a fixed point adjacent the indexing ring beginning when a magnetic signal is impressed on the ring of magnetic recording medium by the magnetic recording head and ending when a later magnetic signal is picked up by the magnetic pick-up head, and round-off delay means which allows the index counting signal means to count an extra index signal when it will improve the accuracy of the index signal count.

6. In a device for measuring rotation of a first member with respect to an angular reference position, the combination which comprises a second member rotatable on the same axis as the first member and independently thereof, means for rotating the second member, a ring of magnetic recording medium disposed on the second member and rotatable therewith around its axis, an indexing ring having a plurality of spaced magnetic index signals disposed on the second member and rotatable therewith around its axis, a magnetic recording head disposed at a fixed position adjacent the ring of magnetic recording medium for impressing a first magnetic signal on the ring of magnetic recording medium, a magnetic pick-up head disposed adjacent the ring of magnetic recording medium and rotatable with the first member, automatic feed-back means for causing the magnetic recording head to make a second magnetic signal on the ring of magnetic recording medium when the first magnetic signal rotates past the magnetic pick-up head, automatic means for counting and recording the number of magnetic signals impressed on the ring of magnetic recording medium, magnetic erasing means for removing the magnetic signals from the ring of magnetic recording material after the magnetic signals have been rotated past the magnetic pick-up head and before the signal positions have rotated back to the magnetic recording head, automatic means for counting the magnetic index signals passing a fixed point adjacent the indexing ring beginning when a magnetic signal is impressed on the ring of magnetic recording medium by the magnetic recording head and ending when a later magnetic signal is picked up by the magnetic pick-up head, and a round-off delay means which allows the index counting signal means to continue to count index signals following the detection of the later magnetic signal for a fixed time interval.

7. In a device for counting a sequence of events which are occurring at substantially a constant rate, the combination which comprises means for converting the occurrence of the events into a sequence of electrical pulses, means for detecting and recording the sequence of pulses, an electrical circuit interconnecting the means for converting the occurrence of the events into a sequence of electrical pulses and the means for detecting and recording the sequence of pulses, an electrical gating means provided in the interconnecting circuit, and round-off means adapted to be actuated by an input pulse, the output of the round-off means being connected to the electrical gating means, with said round-off means serving to hold the gate open following the receipt of an input pulse for a time interval equal to approximately one-half the time interval between two of the sequential electrical pulses.

References Cited in the file of this patent

UNITED STATES PATENTS

| 2,439,446 | Begun | Apr. 13, 1948 |
| 2,680,241 | Gridley | June 1, 1954 |
| 2,702,367 | Ergen | Feb. 15, 1955 |

OTHER REFERENCES

Publication, ERA Shaft-Position Analog-to-Digital Converter.

Transactions of the IRE Professional Group on Instrumentation, pages 55–60, June 1953, 235–61DAC.